United States Patent

Covell et al.

[11] Patent Number: 6,141,463
[45] Date of Patent: Oct. 31, 2000

[54] METHOD AND SYSTEM FOR ESTIMATING JOINTED-FIGURE CONFIGURATIONS

[75] Inventors: Michele Covell, Los Altos Hills; Subutai Ahmed, Palo Alto, both of Calif.

[73] Assignee: Electric Planet Interactive, Palo Alto, Calif.

[21] Appl. No.: 08/984,681

[22] Filed: Dec. 3, 1997

Related U.S. Application Data

[60] Provisional application No. 60/061,569, Oct. 10, 1997.

[51] Int. Cl.[7] ........................................... G06K 9/36
[52] U.S. Cl. .................. 382/286; 382/103; 382/118; 345/358; 345/473
[58] Field of Search ...................... 345/473, 358; 382/118, 199, 154, 103, 286

[56] References Cited

U.S. PATENT DOCUMENTS

| | | | |
|---|---|---|---|
| 5,466,836 | 11/1995 | Lentz et al. | |
| 5,710,833 | 1/1998 | Moghaddam et al. | 382/228 |
| 5,842,194 | 11/1998 | Arbuckle | 706/52 |
| 5,844,573 | 12/1998 | Poggio et al. | 345/441 |
| 5,901,244 | 5/1999 | Souma et al. | 382/190 |

OTHER PUBLICATIONS

"Designing Systolic Architectures for Complete Euclidean Distance Transform", Chen, et al., 8367 Journal of VLSI Signal Processing, 10, 169–179, 1995.

Heck, Larry P. et al, "Transducer Placement for Broadband Active Vibration Control Using a Novel Multidimensional QR Factorization", pp 1–32.

Heck, Larry P. et al, "Large–Scale, Broadband Actuator Selection for Active Noise Control", pp 1–6.

*Primary Examiner*—Andrew W. Johns
*Assistant Examiner*—Gregory Desire
*Attorney, Agent, or Firm*—Burns, Doane, Swecker & Mathis, L.L.P.

[57] ABSTRACT

To estimate the configuration of a figure in a captured image, a silhouette image of the figure is scanned to create a signed distance image. This image identifies the distance of each pixel in the image to the closest edge of the silhouette, and indicates whether the pixel is inside or outside of the silhouette. Multiple distance images of this type are employed to generate an eigen-points model, which provides an affine mapping from the signed distance images to the limb parameters of an authored skeleton. When a new input image is received, it is first processed to create the signed-distance image, and this image is applied to the eigen-points model to estimate limb parameters, such as the locations of various joints in the figure. From this information, each foreground pixel in the captured image can be assigned to one of the limbs.

40 Claims, 8 Drawing Sheets

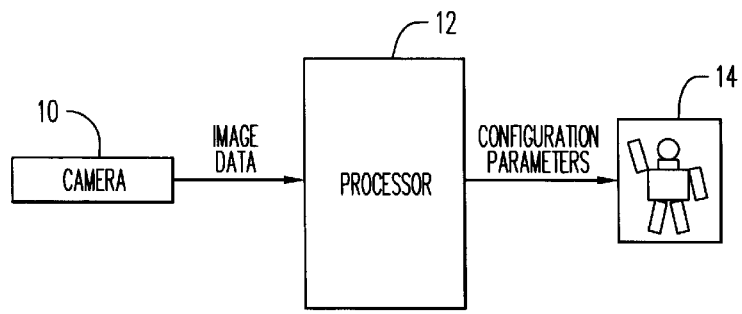
FIG. 1
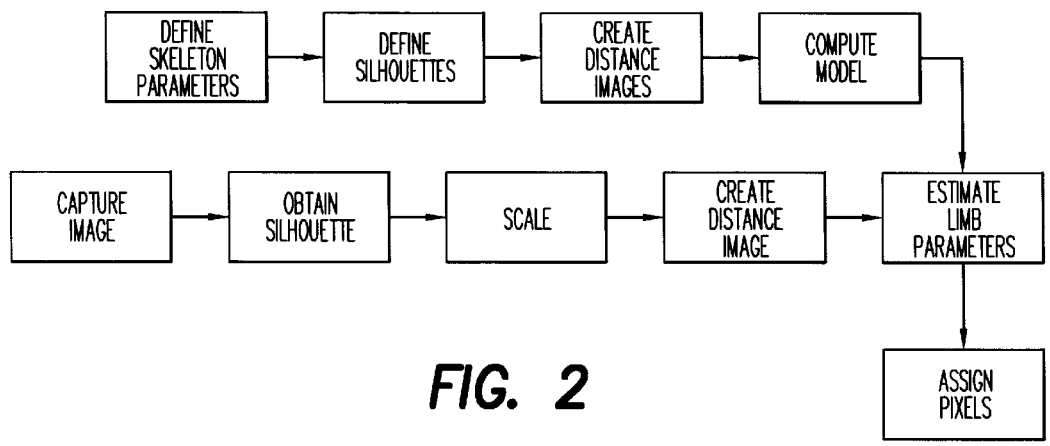
FIG. 2
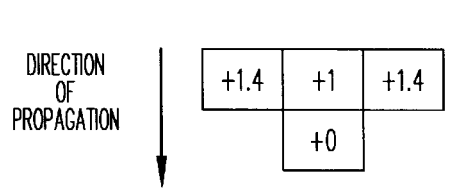
FIG. 5
FIG. 6

METHOD AND SYSTEM FOR ESTIMATING JOINTED-FIGURE CONFIGURATIONS

This application claims benefit of Provisional Application Ser. No. 60/061,569 filed Oct. 10, 1997.

FIELD OF THE INVENTION

The present invention is generally directed to image processing, and more particularly to the automatic estimation of the position and/or orientation of movable limbs in an outline, or silhouette, of a figure.

BACKGROUND OF THE INVENTION

In the field of computerized games and other similar types of interactive video systems, it is desirable to employ real-world images, to provide a measure of customization or personal input to a scene that is being displayed. In one example, an image of a child can be captured, and mapped to one of the characters in an interactive display, e.g. a game, so that the child appears to be a participant in the game itself. For instance, the captured image of the child could function as the "skin" in an interactive system of the type disclosed in U.S. patent application Ser. No. 08/693,028, entitled "System for Image Manipulation and Animation Using Embedded Constraint Graphics", filed Aug. 6, 1996. As an alternative to using a captured image as an a component of the personalized display, the child's image can be used as an input feature, to control elements in the display. For example, if the child waves his hand back and forth, an animated character on the screen can do the same, or perform some exaggerated version of that motion.

To perform either of these types of functions, it is necessary to identify points of reference in the captured image, or texture image, which correspond to control points on the character appearing in the video display. If a captured video stream showing a child is to appear as one of the characters in a personalized game, for example, it is necessary to identify the location of the elbow, wrist, knee, ankle, etc., so that the image can be properly manipulated to appear to move in an intended manner. Similarly, if the image of the child is to function as a control input for the play of the game, it is necessary to identify certain points on that image which correspond to the controllable points on the character to be manipulated in the video display. Identification of control points also permits an otherwise static image to be "parsed" into components that can be manipulated relative to one another to portray movement. For instance, an image of a child's favorite stuffed animal can be manipulated so that it appears to be walking around on the computer screen.

In the past, the identification of correspondence between a texture image and control points on a manipulable character, e.g. a skeleton, was typically carried out by hand. For instance, after an image of a person is taken, a designer might label various pixels in that image as corresponding to the right wrist, left wrist, etc. and correlate them with associated control points on an animated figure. While this approach might be acceptable if a single image of a person is to be captured and labeled, it can become overly burdensome if several images are to be used as input, for example in the case where a video image of a moving child is used to control the motion of a character on the screen. Rather than hand labeling, it may be more appropriate to tag the video input of the child, for example by having him wear apparel that readily identifies the different portions of his body, e.g. green gloves, a blue hat, purple shoes, and the like. With this approach, the different colors in the input image can be used to identify the movements of the child, at least on a very gross level. The need to tag the image, however, alters its original appearance and limits the types of images that can be employed.

It is desirable therefore to provide an automated approach to the identification of jointed limbs, and the like, in a texture image, to thereby avoid the need for hand labeling of images and to permit any type of natural image to be employed, without first requiring a subject of the image to be artificially tagged, or the like.

SUMMARY OF THE INVENTION

In accordance with the present invention, the estimation of limbs and joints in a captured image is accomplished with the use of eigen-points models. As input data, the estimation system is provided with an authored skeleton that describes parameters of interest, such as the various limbs and joints in a figure, as well as the range of variability and motion that is expected to be seen in the limbs and joint angles. Another set of input data comprises an image that is to be analyzed in accordance with the authored skeleton. In a preferred embodiment of the invention, the texture image itself is not analyzed. Rather, a silhouette, or outline, of the subject of interest is analyzed. This silhouette can be obtained by using a background subtraction technique, to isolate the subject from the remainder of the input image.

As a first step, the captured silhouette is rescaled so that it is of approximately the same general dimensions as the authored skeleton. Thereafter, the silhouette image is scanned to create a signed distance image. This image identifies the distance of each pixel in the image to the closest edge of the silhouette, and indicates whether the pixel is inside or outside of the silhouette. Multiple distance images of this type are employed to generate an eigen-points model, which provides an affine mapping from the signed distance images to the limb parameters of the authored skeleton. Thereafter, when a new input image is received, it is first processed to create the signed-distance image, and this image is applied to the eigen-points model to estimate the limb parameters, e.g. the locations of various joints in the figure. From this information, each foreground pixel in the captured image can be assigned to one of the limbs, for example using a nearest-neighbor approach.

Further details regarding the estimation procedure of the present invention are explained hereinafter with reference to specific embodiments illustrated in the accompanying figures.

BRIEF DESCRIPTION OF THE FIGURES

FIG. 1 is a block diagram of the general type of system in which the invention can be implemented;

FIG. 2 is a block diagram illustrating the overall procedure of the present invention;

FIG. 5 is one example of a filter that can be employed to generate the signed distance image;

FIG. 6 is an example of a matrix that can be used to compute the eigen-points model;

DETAILED DESCRIPTION

To facilitate an understanding of the present invention, it is described hereinafter in connection with its application to the estimation of the configuration, or pose, of a jointed figure, using a still-frame image of a person. It will be appreciated, however, that the practical applications of the invention are not limited to this particular embodiment. Rather, the principles which underlie the invention can be employed in a variety of different contexts, in which it is desirable to estimate the location and/or orientation of variable components in an image.

A system in which the present invention might be implemented is illustrated, in general, in the block diagram of FIG. 1. An image of a figure, such as a person, animal or toy, is captured by a camera 10. The camera can be a photographic camera if a single, still-frame image is to be employed, or a video camera if a sequence of images is to be employed. Alternatively, a previously taken photograph might be scanned via an optical scanner. The captured image data is processed in a suitable processor 12, e.g. a personal computer or workstation computer, to determine the configuration, or pose, of the figure. The processor 12 produces a set of parameters which describe the configuration. These parameters can be employed to generate a new image 14 which illustrates the orientation and dimensions of the limbs of the figure.

Figure 3:
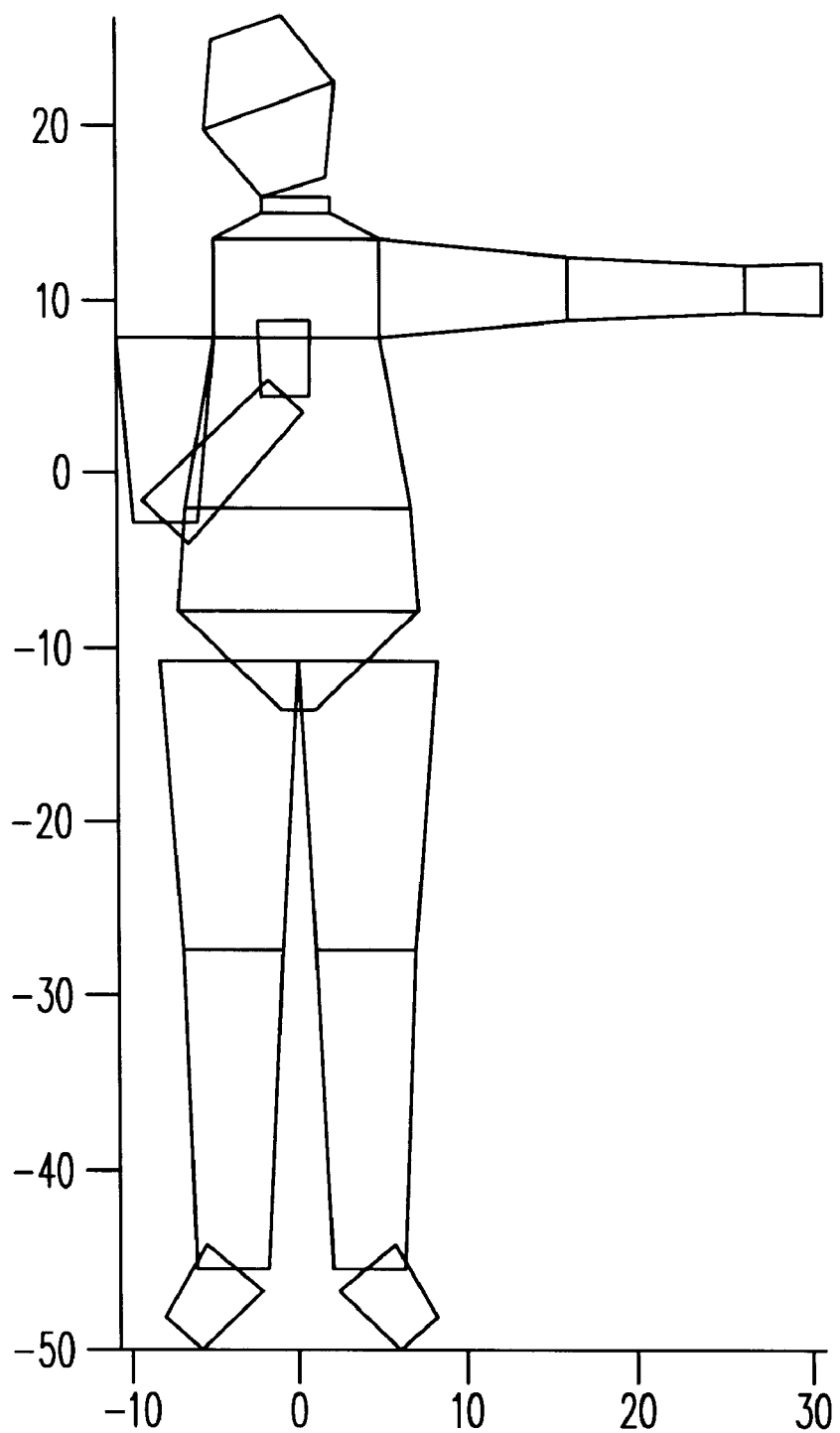
FIG. 3 is an illustration of an authored skeleton.

Generally speaking, the processing of image data within the processor 12 consists of two main parts, (1) the computation of a model which provides a mapping from image data to limb parameters, and (2) the application of new image data to the model to estimate limb parameters. The basic components of these two processes are outlined in block diagram form in FIG. 2. Referring thereto, the designer of a game, or other type of interactive display, authors a "skeleton" which defines features of a character, or other object, that is to appear in a display. One example of such a skeleton is depicted in FIG. 3. The skeleton is described in terms of limbs and joints. In the context of the present invention, all of the individual components of the body e.g. head, torso, etc., are referred to herein as "limbs", rather than just arms and legs. The limbs can be defined in terms of end-point locations and their widths at each end. Other approaches to describing the limbs can be employed as well. A joint is a constraint on the relative positions of two limbs. Typically, this constraint is similar to that which is seen in human skeletal joints, i.e. the end points of the limbs must abut one another. The parameters which define these components include limits on the range of variability that can be expected to be seen. For limbs, this variability defines the range of dimensions, e.g., the waist can be twice as thick as the nominal designated value. For joints, constraints can be defined in terms of their angle of motion, e.g., a shoulder can bend through 270°, while an elbow has a 180° range of motion.

The skeleton parameters are used to create a set of sample silhouette images. For instance, one silhouette image can correspond to the outline of the authored skeleton, as illustrated in FIG. 3. Other silhouette images take into account the variability defined in the skeleton parameters. Thus, for example, in a second sample silhouette image the arm may be extending straight up, and in a third sample image all of the limb dimensions might be at the maximum values within the allowable range of variability. By adjusting the various parameters within their respective variability ranges, a database of sample silhouette images can be created which correspond to exemplary configurations of images that are expected to be captured. As each sample silhouette image is created, it is inherently labeled with its correct configuration, namely the limb parameters that were used to generate it. This database of sample images can be created within the processor 12, or separately generated and then entered as input data.

Preferably, the sample silhouette images are re-scaled so that each has a constant area of image coverage. For instance, the images can be resized so that the number of image pixels within each silhouette is the same. In the absence of such rescaling, the apparent size of the silhouette could vary from one configuration to another, due to the changing of relative limb thicknesses and lengths, as well as internal angles. By normalizing each image to a constant size, the computation of a model and subsequent application of unknown images to the model becomes more straightforward.

In the preceding example, the database of exemplary configurations is created from artificial silhouettes generated from the skeleton parameters. If desired, this database can be extended with examples derived from real silhouettes. In this case, each real silhouette is labelled with the parameters of a skeleton configuration that most closely matches it. This labelling might be done manually, for example, or by using a tagged image in which the subject wears different apparel on different limbs to readily distinguish them from one another.

Figure 4:
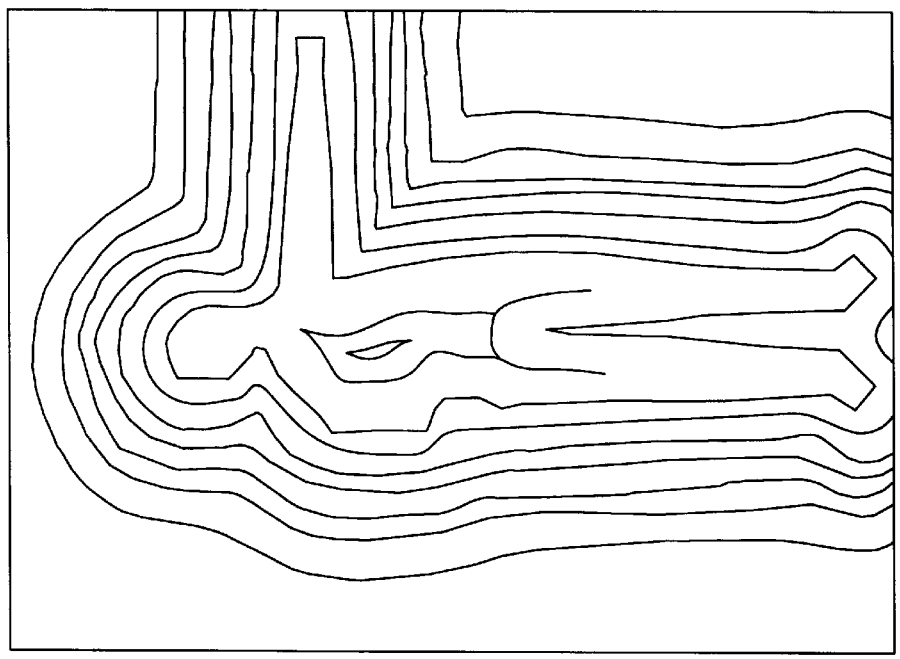
FIG. 4 is an illustration of a silhouette and an associated signed distance image.
Figure 4:
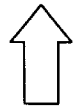
Figure 4:
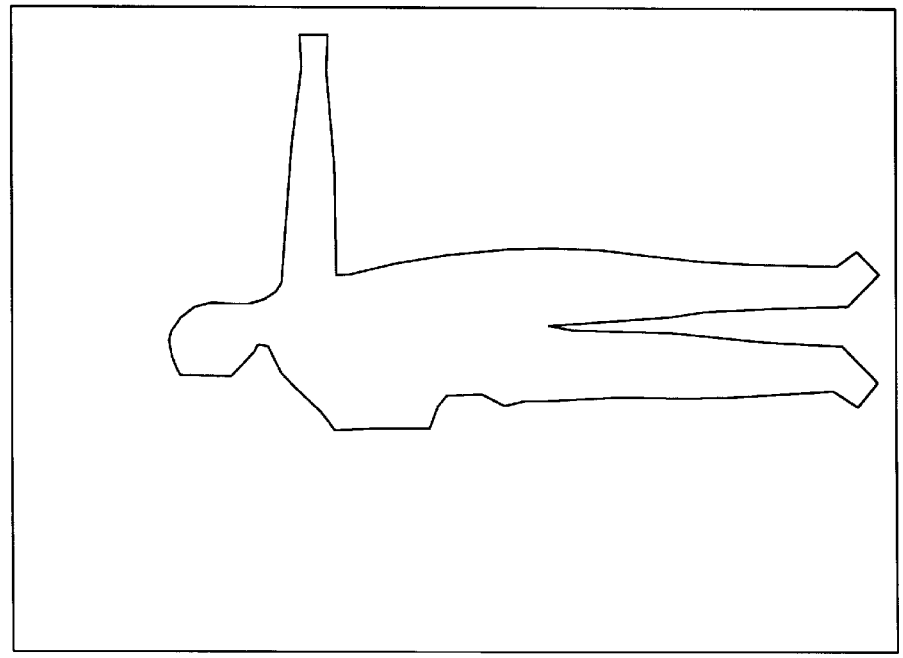

The skeleton functions as an explicit hidden model, in the sense that it is not visible in an image captured by the camera. To train an estimation model whose input comprises image data, visual representations are generated from the hidden model. To this end, therefore, a signed distance image is created from each of the sample silhouette images in the database. An example of this process is depicted in FIG. 4. Referring thereto, the left side of the figure depicts an original sample silhouette image, and the right side illustrates the distance image that is created from it. In the example of FIG. 4, the distance image comprises a series of gradient lines which represent various distances from the closest edge of the silhouette. In practice, rather than employing lines of the type illustrated in FIG. 4, each pixel in the image can be assigned a value which represents its distance from the edge of the silhouette. The pixels which are at the boundary of the silhouette have a value of zero. Each pixel is also labeled with a sign, to indicate whether it lies inside or outside of the silhouetted figure. For example, the pixels inside the figure might have a positive value, whereas those outside could be negative. Alternatively, the pixels outside of the image can have positive values, and those inside could be negative.

The computation of the distance of each pixel from the edge of the silhouetted figure, to create the distance image, can be carried out by means of any suitable known technique. One approach is to employ uniform processing by means of four scans of the image in the respective directions down, up, left and right. At the beginning of the process, all of the pixels in the image can be given a nominal amplitude value, except those on the border, which have a value of zero. The background pixels, i.e., those outside of the silhouette, have a large negative value, and those inside the figure have a large positive value. During each scan, the value of a current pixel of interest is compared to pixels which have been previously processed. FIG. 5 illustrates an example in which the current pixel of interest is compared to three previously processed pixels. In this example, the direction of propagation of the processing is downward. The pixel immediately above the current pixel has a value of 1 added to its amplitude, and the pixels to the immediate left and right of this pixel have a value of 1.4 added. The resulting amplitudes are compared to one another, and to the current amplitude assigned to the current pixel. The smallest amplitude value of the four is selected as the value for the current pixel. The sign of the current pixel is maintained at its original value. After processing all of the pixels in the image in this manner for each of the four respective directions, the result is a distance image, of the type illustrated in FIG. 4. The signed distance image constitutes a visual model, or representation, of the hidden model skeleton.

The data that results from the creation of the hidden and visual models can then be used to create an eigen-points estimation model. An example of the data matrix which is used to compute such a model is illustrated in FIG. 6. Each of the different sample silhouette images corresponds to a different configuration $C_i$, of the figure, e.g. a different pose. Associated with each configuration is a set of skeleton parameters $Y_1 \ldots Y_n$. These parameters describe the width and end points of each limb, and the angular rotation about each joint. The distance image associated with each configuration also defines a set of input values $X_1, X_2 \ldots X_m$. The signed distance value of each pixel in the image can form an input value $X_i$. In addition, summary statistics derived from the distance image can form additional input values. For instance, one set of summary statistics might be the offsets of a bounding box for the silhouette. The skeleton parameters and distance image pixel values for all of the sample silhouette images are combined, to form a data matrix as illustrated in FIG. 6. This matrix is used to compute an eigen-point model for the estimation of configurations of unknown images, as described in U.S. patent application Ser. No. 08/651,108, the disclosure of which is incorporated herein by reference.

Once the model has been computed, it can then be used to estimate the configuration of figures in other images. Referring back to FIG. 2, a new image is captured and a silhouette is obtained of the main object, for example using background subtraction techniques as discussed previously. One example of a background subtraction that can be used for such a purpose is described in Wren, C. R, et al, "*Pfinder: real-time tracking of the human body*", IEEE Transactions on Pattern Analysis and Machine Intelligence IEEE Comput. Soc, July 1997, Vol. 19, No. 7, pps. 780–785. Thereafter, the image is rescaled, for example by means of resampling, so that the silhouette is of approximately the same size as the figures which were used to create the model, e.g. it contains a prescribed number of pixels.

Figure 7:
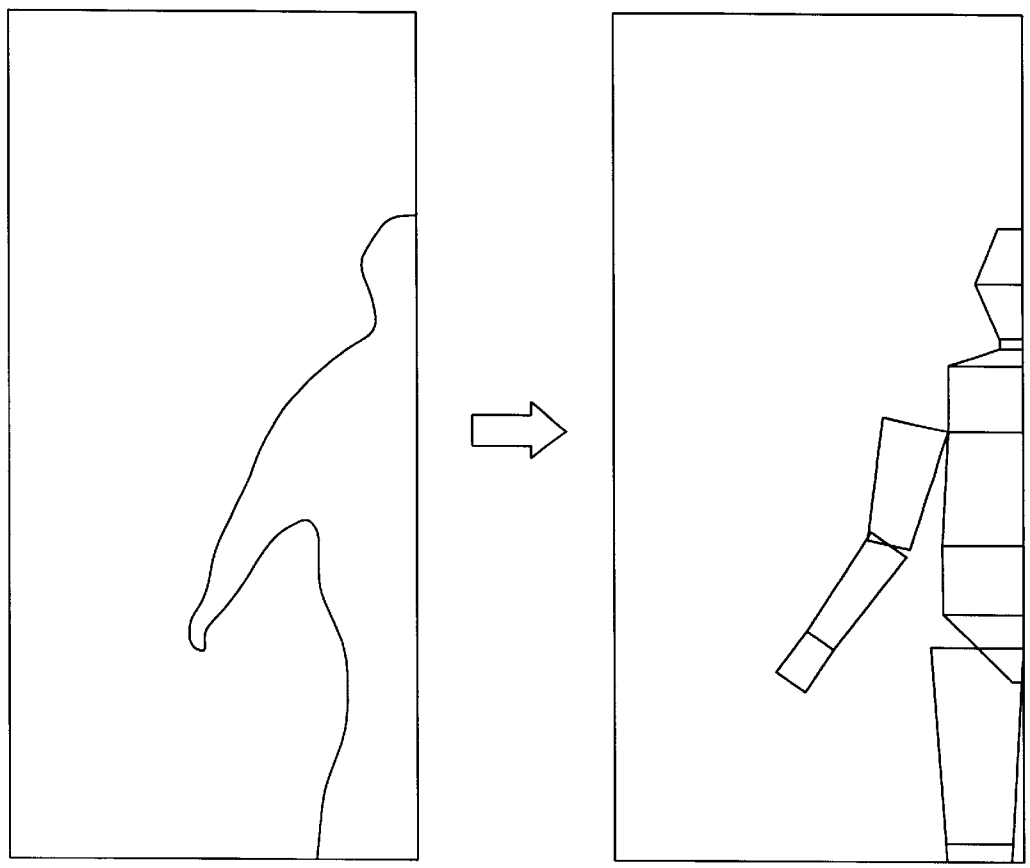
FIGS. 7–9 are comparisons of input silhouette images and resulting configuration estimates.
Figure 8:
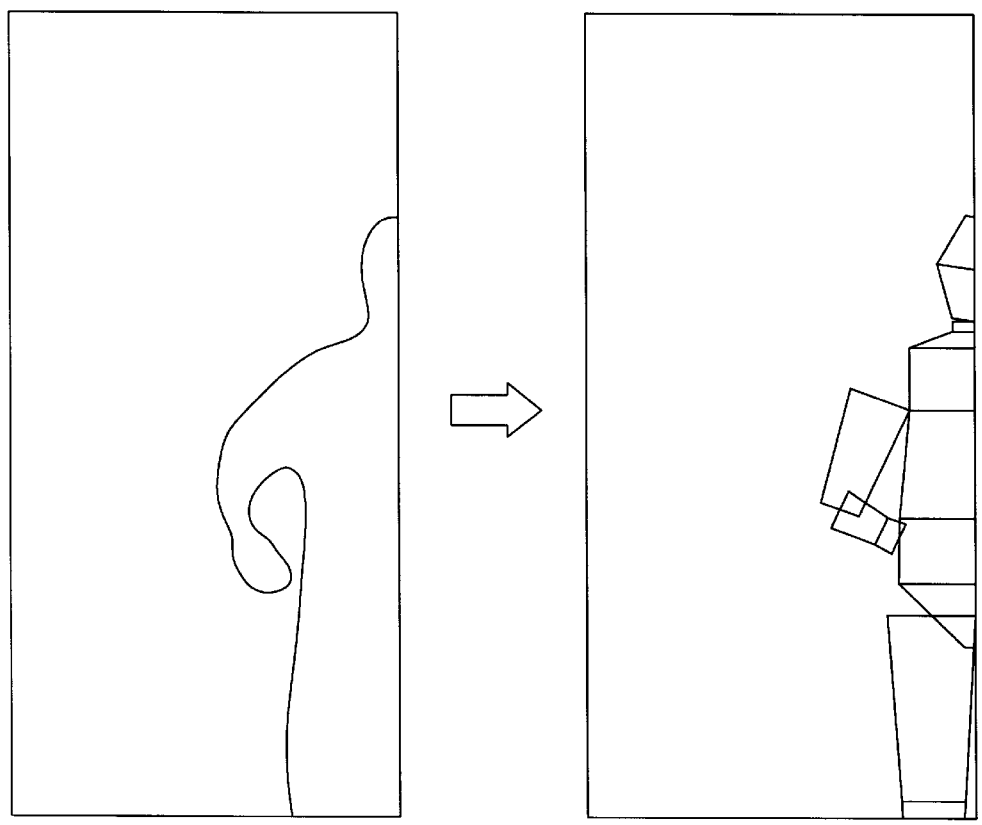
Figure 9:
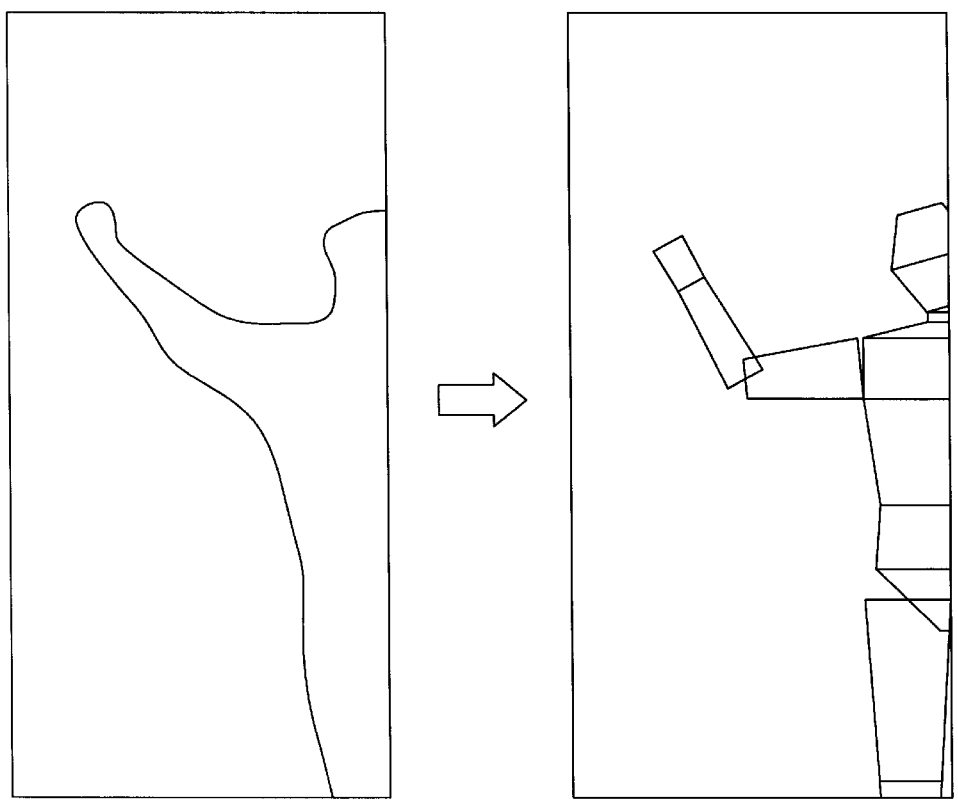

Once the appropriate size silhouette has been obtained, a signed distance image is generated, in accordance with the manner described previously. The pixel values $X_1 \ldots X_m$ of the new distance image are then applied to the model, to generate an estimate of the configuration of the figure in the captured image, which is defined in terms of the skeleton parameters $Y_1 \ldots Y_n$. The procedure for using an eigen-points model to generate an estimate is also described in detail in U.S. patent application Ser. No. 08/651,108. The result of this procedure in the context of the present invention is an estimate of the location and orientation of each of the limbs in the figure. FIGS. 7–9 illustrate examples of original silhouette images and the corresponding estimates of the skeleton configuration that are generated via this procedure. In these examples, only the upper left sector of each silhouette, and its corresponding estimate, are shown.

To facilitate the use of these estimates in games and other interactive graphic presentations, it may be desirable to assign each of the pixels in the foreground image, i.e. those which make up the silhouette, to an associated limb. Such an assignment can be carried out, for example, by using a nearest-neighbor approach, in which each pixel of the foreground subject is labeled in accordance with the nearest estimated limb.

To further improve the accuracy of the estimate, a recursive approach known as Estimate Maximize, or EM, can be employed. In this approach, the assignment of each pixel in the foreground image to a limb can be carried out by means of probabilities, e.g. a particular pixel has a 90% probability of belonging to the left forearm, and 10% likelihood of belonging to the torso. These assignments are then used to compute new estimates of the limb parameters. For instance, an ellipsoid fitting technique can be employed to determine the orientation and location of each limb. If necessary, the ellipsoid fitting can be constrained to enforce required joint positions. Once the limb parameters are re-estimated in this manner, the new estimate can then be employed to re-assign the pixels to corresponding limbs. A suitable number of iterations can be employed to re-estimate the limb parameters and re-assign the pixels, until a desired level of accuracy is achieved. The determination of accuracy can be made by creating a hypothesized silhouette image from the estimated parameters, and comparing that image with the original captured silhouette image.

Figure 10:
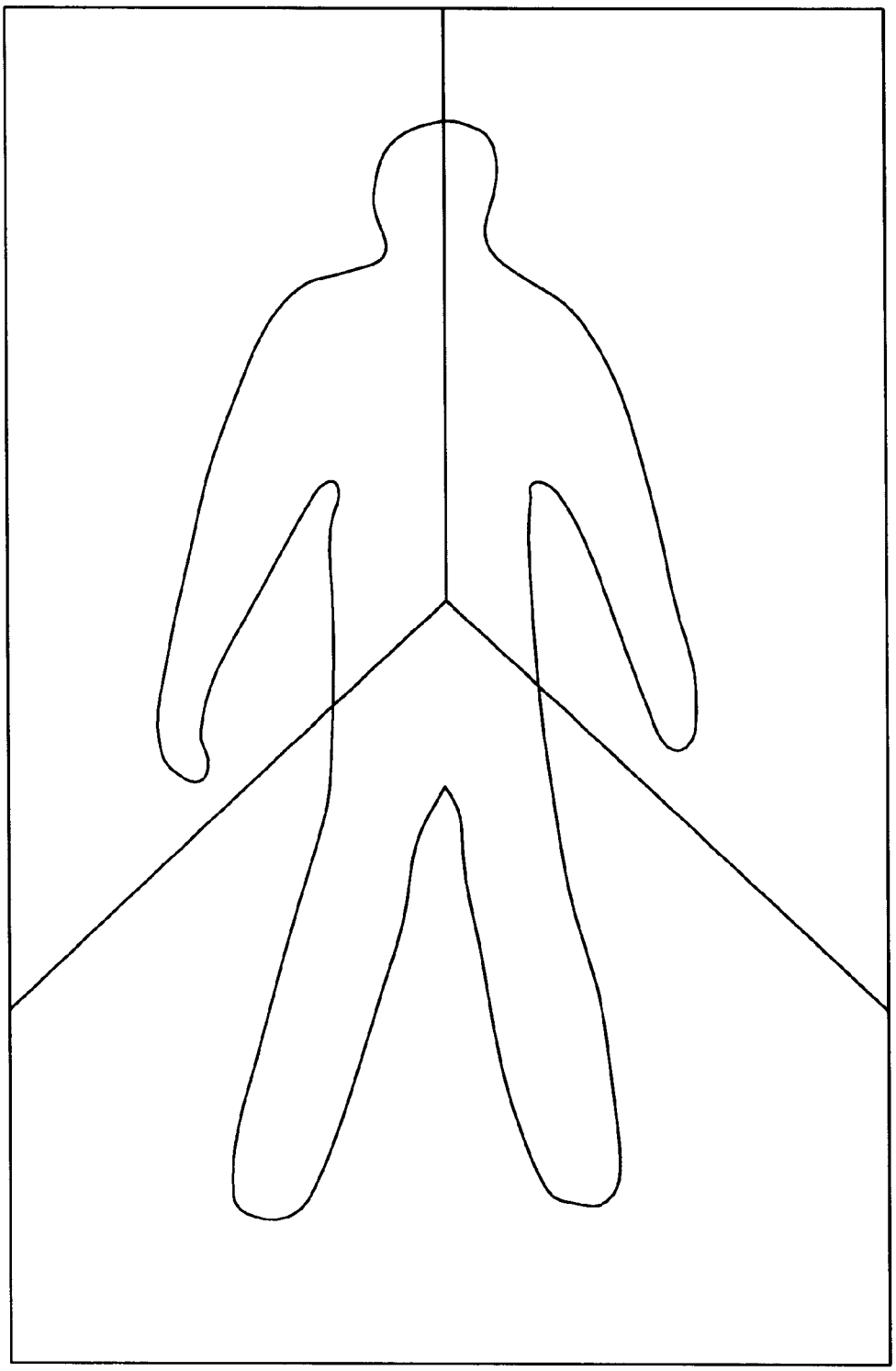
FIG. 10 is an illustration of one type of sectioning of a silhouette image.

If a single eigen-points model is used for the entire skeleton, the size of the data set that describes the allowable variations may be unacceptably large. To limit the amount of data that must be processed, different parts of the silhouette which are independent of one another can be separately treated in the generation of the distance image. For instance, in the case of a human skeleton, the positions of the legs are not influenced by the positions of the arms, and vice versa. Therefore, the skeleton can be divided into three triangular-shaped sections, one of which covers the two legs, with the other two being respectively associated with the left and right arms, and their corresponding halves of the torso. An example of such partitioning of a silhouette image is illustrated in FIG. 10. If a detailed head position estimate is needed, the image can be divided into four sections which isolate the respective movable limbs. In general, the separation of the limbs can be carried out in accordance with the requirements of the designer of the skeleton. Although not illustrated in FIG. 10, adjacent sectors can overlap one another.

Figure 11:
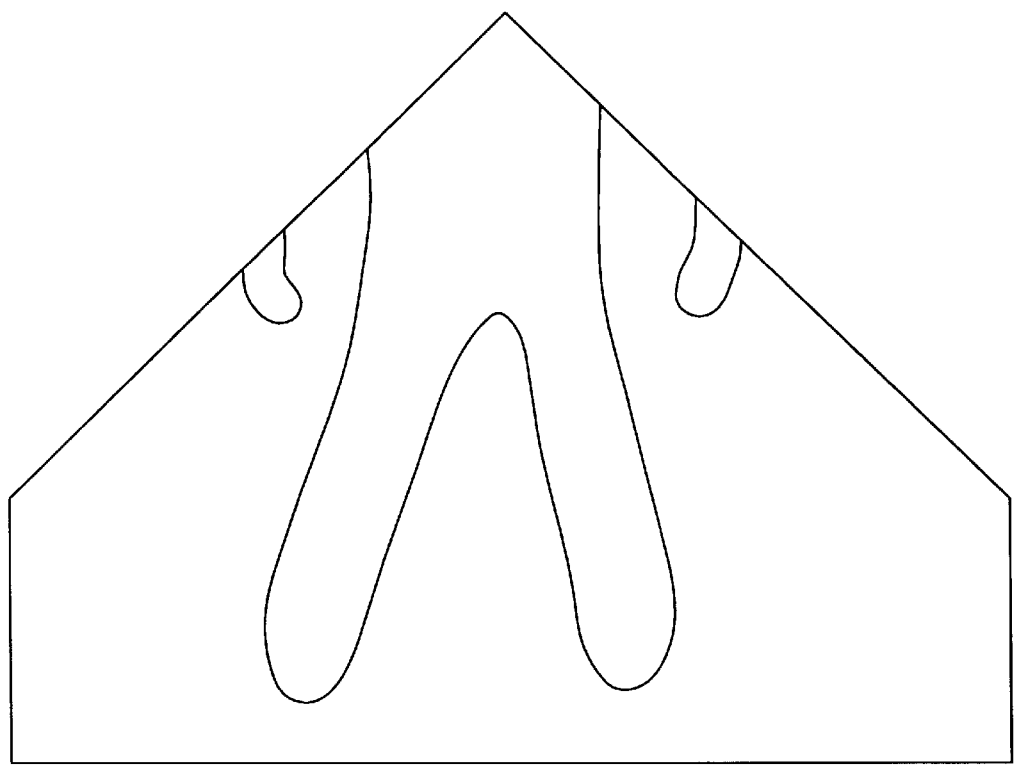
FIG. 11 is an illustration of a sector having limbs associated with a different sector.

Depending upon the configuration of the silhouette, pixels belonging to one limb may appear in a sector which is associated with different limbs. For instance, in a captured image of a toy gorilla, the hands might be hanging sufficiently low that they appear in the sector which pertains to the legs. An example of such a situation is depicted in FIG. 11. To avoid the possibility that pixels associated with the hands affect the analysis of the leg limbs, a connected components analysis can be employed. Generally speaking, the pixels within the sector are analyzed to determine whether those inside the silhouette are all connected to one another, or if they define separate groups of pixels. If two or more separate groups are identified, a main group is selected and all other pixels which do not belong to the main group are treated as being outside of the silhouette, e.g. their signs are changed to negative for that sector. The main group can be selected as the largest group, or the group which is located in the center of the sector, or in accordance with any other suitable criteria. This analysis is done prior to computing the distance image for the sector, so that the disconnected components will not affect the values within that sector's distance image.

Once the silhouette has been partitioned, each sector is separately processed to generate the distance image data, and a separate eigen-points model is computed for each sector. When estimating the configuration of a new image, it is partitioned in a similar manner, and configuration parameters are estimated for each of the various sectors. These configuration parameters are then combined, to provide an overall estimate of the configuration for the figure.

In order to successfully partition a silhouette in this manner, a reference point needs to be located with respect to the figure. For example, the reference point could be center of the figure's torso. One possible approach for locating the center of the torso is to employ an eigen-points model. In this approach, the sample silhouette images are aligned in accordance with the center of mass of the silhouette, to provide a point of reference. For each center-of-mass-aligned silhouette, the center of its torso is designated as an offset relative to the center of mass. This data is determined for each sample silhouette image, and used to compute an eigen points model that can then be employed to estimate the torso center from the center-of-mass-aligned image of a new, unknown figure. To compute this model which locates the figure's reference point from the silhouette aligned at its center of mass, the full space of limb configurations must be sampled. However, the sampling of the space of limb configurations can be much coarser than that which is employed to estimate configuration, since the only information that is required from the initial model is the reference point, rather than any details of where the limbs are located and how wide or long they may be. The sectors are then defined relative to this newly estimated reference point on the figure.

Another factor which needs to be considered in the application of input data to the eigen-points model is the alignment of the various figures. Generally speaking, proper alignment requires that each pixel contain information about the same object location in each of the sample images. Thus, if a pixel located at coordinate point $x_i$, $y_i$ contains information that is most directly related to the position of the wrist in one image, correct alignment requires that that same information be at position $x_i$, $y_i$ in all sample images. However, this requirement does not hold true in the case of jointed skeletons. More particularly, if the center of torso is employed as the origin, the same pixels cannot be used to describe the position of the wrist, since the wrist is at the opposite end of a double pendulum from the torso, one of which is jointed at the shoulder, and the other of which is jointed at the elbow.

To overcome this problem, an iterative alignment approach is employed for limb estimation. A center-of-mass aligned model can be used to estimate the torso center, as described above. That estimate is used to re-align the data to be torso centered. At this point, if needed, the silhouette can be divided into sectors, as described previously. If this is done, new sector-specific distance images can be computed. If division into sectors is not needed, then the re-aligned distance image can be derived by simply shifting the original distance image and filling in any uncovered pixel locations. A torso-aligned model can then be used to estimate the elbow position fairly accurately. More particularly, from the torso it is possible to reliably estimate the location of the shoulder, and from the shoulder the elbow position can be determined, since it is at the end of a single pendulum which is pivoted at the shoulder. Once the position of the elbow is determined, an "elbow-centered" model can then be used to estimate the wrist position since this, again, only requires the determination of the orientation of a single pendulum. The elbow-centered distance image can either be computed as a simple shift of the current sector-specific distance image or it can be recomputed using a new sector aligned on the elbow. If a simple shift of the current sector-specific distance image is used, the only computation that is necessary is filling in any pixel locations uncovered by the re-alignment (that is, by the shift imposed by the estimated elbow locations). If a new sectoring of the silhouette is used, then a new sector-specific distance image is computed after aligning the silhouette on the elbow locations, applying the sector mask, and optionally removing disconnected components. A similar approach to that described above can be used for other multi-jointed limbs. Each new alignment uses a different model.

There are numerous dimensions which can be used to estimate jointed-figure configuration parameters. For instance, using a "torso-centered" alignment, it may be helpful to explicitly include the position of the center of mass in the input data. It may also be advantageous to include explicit dimensions which identify the extent of the silhouette, i.e. how far does the silhouette extend in each of four directions relative to the chosen origin. For the "elbow-centered" alignment, the space of possibly useful input dimensions may be even larger. For example, some information about the location of the wrist might be reliably encoded in the "elbow-centered" aligned images, but other pieces of information may be best described by the "torso-centered" alignment. Consequently, it can be seen that the number of input dimensions can rapidly grow, to a point where run-time processing is hampered. In such a case, it may be feasible to employ input data subselection.

Generally speaking, when subselection among the possible input parameters is employed, the objective is to retain the input dimensions that best couple to the output parameters to be estimated. A general approach along these lines is described in Heck, L. P., et al, *"A Multidimensional Householder QR Algorithm for Transducer Placement in Active Noise Control Systems"*, Proceedings of 1995 Workshop on Applications of Single Processing to Audio and Acoustics, IEEE ASSP Workshop on Applications of Signal Processing to Audio and Acoustics, Oct. 15–18, 1995., pps. 57–60; and Heck, L. P., et al, *"Broadband Sensor and Actuator Selection for Active Control of Smart Structures"*, Smart Structures and Materials 1995, Mathematics and Control in Smart Structures, February–March 1995, Proceedings of the SPIE—The International Society for Optical Engineering (1995) Vol. 2442, pps. 292–303.

In the technique described in these papers, a transfer function matrix, T, is formed to control pressure modes from vibrational sources. A pivoted QR decomposition, TΠ=QR, is then computed, where Π is a "pivoting" matrix (i.e., it is unitary and contains only 1's and 0's and has the effect of re-ordering the columns of the preceding matrix), Q is a unitary matrix (it rotates the orientation of any matrix that pre- or post-multiplies it; it does not change the vector lengths or cause shearing), and R is an upper triangular matrix (it has all zeros below the main diagonal) with positive, decreasing elements on its main diagonal. This analysis can be interpreted as having Π give the "best-first" ordering of the input dimensions so that they all couple well to the output dimensions. The ordering is the column order described by the pivoting matrix. This ordering can be used to give the optimal set of nested subselections. If only 2 sources are allowed, the sources indicated by first 2 columns of the pivoting matrix would be used. If 20 sources are allowed, the sources indicated by the first 20 columns of the pivoting matrix would be used.

In the context of the present invention, the simple application of a pivoted QR decomposition is not sufficient by itself for subspace selection. This is due to the fact that, in addition to taking into account how each input dimension couples to the output dimensions that are to be estimated, it is also important to consider how much energy is in the input dimensions that do not couple linearly to the output dimensions to be estimated. Consider, for example, the problem of estimating the x-axis position of the forearm of the silhouette. One pixel that is near the torso of the silhouette can sometimes be inside the torso and sometimes be outside (depending on the thickness of the waist). Another pixel can be far from the torso of the body, near the outer edge of the image. It may be the case that the first pixel often shows a strong linear coupling to the x-axis position of the forearm of the silhouette but that it sometimes loses that dependence due to the thickening of the waist. In this case, there will be strong non-linear interactions with the waist size. Since the eigen-points model can not account for the non-linear coupling, this pixel will have a lot of energy which is not coupled to the output space and, despite the strong linear coupling, its estimates of the forearm position will often be wrong due to this decoupled energy. The other pixel, the one that is always outside the silhouette, may show a slightly weaker coupling to the x-axis position of the forearm but show that coupling without the complicating non-linear interactions. This pixel is then likely to give a more reliable estimate of the wrist position.

It is advisable to account for both types of energy in the input dimensions (energy that is linearly coupled to the output dimensions and energy that is not) when input subselection is performed. One approach to doing this is to do an analysis that, like the approach of the referenced papers, relies on a pivoted QR decomposition. In the context of the present invention, however, the pivoting criteria is different. Instead of simply maximizing the energy that is "explained" by adding a new input, the objective is to maximize the percent of the energy in the input dimension which is "newly" coupled to the output dimensions. Only newly coupled energy is considered, so that input dimensions that all couple into a single variational mode of the output dimensions are not selected. This can be done using two QR decompositions per step.

To begin such an iterative approach, a data matrix which describes all the training data, $M=[M_{out}\ M_{in}]$, is first computed, where each of the L rows of M corresponds to a different jointed-figure configuration; where each of the $N_{out}$ columns of $M_{out}$ holds the data for a different output parameter (the ones to be estimated, such as the forearm position); and where each of the $N_{in}$ columns of $M_{in}$ holds the data for a different input dimension (e.g. the pixels from the aligned distance image). The remaining steps are done first on this data matrix and, subsequently, on a reduced version of this data matrix.

During each iteration, in which another input dimension is selected for retention, the following steps are carried out.

1. Compress the remaining output variations: The first step is to compress all the remaining variations in the output dimensions into the first several rows of the data matrix and, simultaneously, perform the same transformation on the input matrix to compress the energy in the input dimensions that are coupled to those output variations into the same rows. This is done by performing a QR decomposition on the output data matrix $$M_{out} = Q_{out} \begin{bmatrix} R_{out} & T_{out} \\ O & O \end{bmatrix} \begin{matrix} L_{out}(N_{out}-L_{out}) \\ \hline L-L_{out} \end{matrix}$$

where $R_{out}$ is an upper triangular matrix with all positive numbers on its main diagonal and $L_{out}$ is the number of rows and columns in this matrix. This results in only $L_{out}$ linearly independent modes of variation in the current output data matrix.

Then, by pre-multiplying the full data matrix by $Q_{out}^H$ all the variation in the output dimensions are compressed into the first $L_{out}$ rows and all the variations in the input dimensions which are linearly coupled to the output dimensions are compressed into the first $L_{out}$ rows. Define $Q_{out}^H M_{in} = T_{in}$ where the top $L_{out}$ rows of $T_{in}$ are variations that couple to the output and where the remaining $L-L_{out}$ rows do not.

2. Compute the selection criteria for the remaining input dimensions: The next step is to compare the remaining input dimensions, to decide which input dimension should be selected next for use. To do this, the ratio is computed of the coupling from each input dimension to the remaining output variations to the total variations in that input dimension.

$$\text{Define } P_j = \left(\sum_{i=1}^{L_{out}} w_i |T_{in}(i,j)|\right) \div \left(\sum_{i=1}^{L} |T_{in}(i,j)|\right)$$

where $\Sigma w_i = L_{out}$ with all $w_i \geq 0$.
Define $J_{best}$ as the column with the largest value of $P_j$. This is the next column which is selected for an input dimension.

The weighting factor $w_i$ is selected to emphasize the directions of variation that are considered to be more important. Such a determination can be based on the visual effect of the corresponding variation in the output columns, i.e. the skeleton configuration parameters. In another approach, the weightings can be derived from the diagonal entries of $R_{out}$. These diagonal entries reflect the strength of each dimension in the remaining output variations.

3. Remove the selected column and the variations that are linearly coupled to it from further consideration: The next thing to do is to note which column has been selected: that is, which input dimension $J_{best}$ corresponds to. Having done this, this column and associated variations are removed from further consideration. To do this, a one-column QR is performed on the $J_{best}$ column (which compresses all the variations in that column to the first row) and the resulting Q matrix is used to pre-multiply the full data matrix, M (which compresses all the variations that are linearly coupled to those in the $J_{best}$ column into the first row). The first row is then removed from $M_{out}$ and $M_{in}$ (or, equivalently from M) and the $J_{best}$ column is removed from $M_{in}$ (or, equivalently from M). The process is then repeated from Step 1. This is done either until all the output variations have been removed from the data matrix or until an acceptable number of input dimensions have been selected, whichever comes first.

As a result, the input data is reduced to an amount which facilitates more efficient run-time processing to generate estimates of the configuration of figures in captured images.

Once the configuration of a figure in a captured image has been estimated, it can be used in a variety of ways. For instance, control points can be identified on the figure, which might correspond to certain joints or end points of limbs. These control points can then be used to manipulate the image of the figure, so that it performs a sequence of desired movements, e.g. walking. In another implementation, movement of limbs which occur over a sequence of captured images in a video stream can be mapped to another figure, such as a cartoon character or an image of a toy, to cause that figure to perform the same movements as a person in the video.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for estimating the configuration of a figure in an image, comprising the steps of:

generating a plurality of poses for a figure, each having an associated configuration that is defined by a plurality of configuration parameters;

for each pose, generating a representation image that is defined by a plurality of representation parameters;

computing an eigen-points model for figure configurations, based upon said configuration parameters and said representation parameters associated with said plurality of poses;

generating a representation image for a new image of a figure whose configuration is unknown;

applying the representation parameters for said new image to said model; and generating a set of configuration parameters for the new image from said model.

2. The method of claim 1 wherein said representation image is a signed distance image which identifies the distance of pixels in the image from a border of the figure.

3. The method of claim 2 wherein said representation parameters comprise signed distance values for the pixels of the representation image.

4. The method of claim 2 wherein said representation parameters comprise distance values for the pixels of the representation image and summary statistics derived from the representation image.

5. The method of claim 4 wherein said summary statistics include bounding box offsets for the image of the figure.

6. The method of claim 1 wherein a figure is described by a combination of limbs and joints, and said configuration parameters comprise values for the dimensions of limbs and angular rotation of joints.

7. The method of claim 6 further including the step of assigning the pixels of the figure in said new image to the limbs of the figure.

8. The method of claim 7 wherein the steps of generating configuration parameters and assigning pixels are iteratively repeated a plurality of times.

9. The method of claim 1, further including the steps of dividing the figure into a plurality of sectors, and computing a representation image and an eigen-points model for each sector.

10. The method of claim 9, wherein the figure is divided into sectors on the basis of a reference point, and further including the steps of aligning each of the poses of the figure in accordance with its center of mass, designating a reference point relative to the center of mass, computing an eigen-points model of the reference points, determining the center of mass for said new image, estimating the reference point for the new image in accordance with said eigen-points model of the reference points, and sectoring said new image on the basis of the estimated reference point.

11. A method for determining the configuration of a limb on a figure, where the position of the limb can result from the combined movements of a plurality of jointed limbs, comprising the steps of:

computing a first learned model which is based upon a first reference point that is determined with respect to a first limb of a figure, and using said first model to estimate the position of a second reference point on a second limb that is connected to said first limb;

computing a second model which is based upon the second reference point, and using said second model to estimate the position of a third reference point relative to said second reference point; and combining the estimates for the second and third reference points to estimate the position of said third reference point relative to said first reference point.

12. The method of claim 11 wherein said first limb is the torso of the figure, and said first reference point is the center of the torso.

13. The method of claim 12 wherein the center of the torso is determined by aligning each of multiple poses of the figure in accordance with its center of mass, designating said first reference point relative to the center of mass, computing an eigen-points model of the first reference point, determining the center of mass for a new image, and estimating the reference point for the new image in accordance with said eigen-points model of the reference points.

14. The method of claim 11 wherein the figure is an image of a silhouette, and wherein said first reference point is the center of mass of the silhouette, and said second and third reference points are joints which are respectively located at more remote positions from the center of mass.

15. The method of claim 11, wherein said model is an eigen-points model.

16. In a system which estimates parameters of an image by means of a model which is based upon a data matrix comprising an input data matrix of image values and an output data matrix containing said parameters, a method comprising the steps of:

(i) transforming the output data matrix by compressing variations in all rows of the output data matrix into a lesser number of rows, and applying the same transformation to the rows of the input data matrix;

(ii) determining the relationship between (a) the coupling from each input dimension to the output variations in said lesser number of rows, and (b) the total variations in that input dimension;

(iii) selecting one of said input dimensions on the basis of said determination;

(iv) removing the selected input dimension and output variations which are coupled to the selected input dimension from the data matrix to produce a reduced data matrix;

(v) iteratively repeating steps i–iv with respect to the reduced data matrix, to select additional input dimensions and coupled output variations;

(vi) computing a model to estimate said parameters on the basis of said selected input dimensions and coupled output dimensions; and (vii) processing image values for an image whose parameters are unknown in accordance with said model to estimate the parameters for said image.

17. The method of claim 16, wherein said compressing step is carried out by performing a QR decomposition on the output data matrix.

18. The method of claim 17 wherein said removing step is carried out by performing a one-column QR decomposition on the column of said data matrix which corresponds to the selected input dimension.

19. The method of claim 16, wherein the selected input dimension is the dimension which exhibits the highest ratio of (a) to (b).

20. The method of claim 16, wherein said model is an eigen-points model.

21. A method for estimating parameters which pertain to a visible image, comprising the steps of:

developing an explicit hidden model which describes said parameters and variations of said parameters;

using said hidden model to generate visual representations of images;

training an eigen-points model on the basis of both said hidden model and said visual representations;

generating a visual representation of an image whose parameters are unknown; and applying said visual representation to said eigen-points model to estimate said parameters for said image.

22. The method of claim 21 wherein said hidden model is a skeleton of a figure, and said parameters define the configuration of limbs and joints that make up the figure.

23. The method of claim 21 wherein said visual representation is a signed distance image of a silhouette.

24. A method for estimating the configuration of a figure in an image, comprising the steps of:

generating a plurality of poses for a figure, each having an associated configuration that is defined by a plurality of configuration parameters;

for each pose, generating a signed distance image having values which identify the distance of pixels in the image from a border of the figure;

computing a learned model for figure configurations, based upon said configuration parameters and said distance image values associated with said plurality of poses;

generating a signed distance image for a new image of a figure whose configuration is unknown;

applying the distance image values for said new image to said model; and generating a set of configuration parameters for the new image from said model.

25. The method of claim 24 wherein a figure is described by a combination of limbs and joints, and said configuration parameters comprise values for the dimensions of limbs and angular rotation of joints.

26. The method of claim 25 further including the step of assigning the pixels of the figure in said new image to the limbs of the figure.

27. The method of claim 26 wherein the steps of generating configuration parameters and assigning pixels are iteratively repeated a plurality of times.

28. The method of claim 24, further including the steps of dividing the figure into a plurality of sectors, and computing a representation image and a learned model for each sector.

29. The method of claim 28, wherein the figure is divided into sectors on the basis of a reference point, and further including the steps of aligning each of the poses of the figure in accordance with its center of mass, designating a reference point relative to the center of mass, computing a model of the reference points, determining the center of mass for said new image, estimating the reference point for the new image in accordance with said model of the reference points, and sectoring said new image on the basis of the estimated reference point.

30. The method of claim 24 wherein said learned model is an eigen-points model.

31. A method for estimating the configuration of a figure in an image, comprising a learning phase and an estimation phase, wherein said learning phase includes the steps of:

generating a plurality of poses for a figure, each having an associated configuration that is defined by a plurality of configuration parameters;

for each pose, generating a representation image that is defined by a plurality of representation parameters; and computing a learned model for figure configurations, based upon said configuration parameters and said representation parameters associated with said plurality of poses;

and wherein said estimation phase is carried out after the completion of said learning phase, and includes the steps of:

generating a representation image for a new image of a figure whose configuration is unknown;

applying the representation parameters for said new image to said model; and generating a set of configuration parameters for the new image from said model.

32. The method of claim 31 wherein said representation image is a signed distance image which identifies the distance of pixels in the image from a border of the figure.

33. The method of claim 32 wherein said representation parameters comprise signed distance values for the pixels of the representation image.

34. The method of claim 32 wherein said representation parameters comprise distance values for the pixels of the representation image and summary statistics derived from the representation image.

35. The method of claim 31 wherein said learned model is an eigen-points model.

36. A method for determining the configuration of a limb on a figure, where the position of the limb can result from the combined movements of a plurality of jointed limbs, comprising the steps of:

computing a first learned model which is based upon a first reference point that is determined with respect to a first limb of a figure, and using said first model to estimate a first region on a second limb that is connected to said first limb;

determining a second reference point within said first region;

computing a second model which is based upon the second reference point, and using said second model to estimate the position of a second region on the figure, relative to said second reference point;

determining a third reference point within said second region; and combining the estimates for the first and second regions to estimate the position of said third reference point relative to said first reference point.

37. The method of claim 36 wherein said first limb is the torso of the figure, and said first reference point is the center of the torso.

38. The method of claim 37 wherein the center of the torso is determined by aligning each of multiple poses of the figure in accordance with its center of mass, designating said first reference point relative to the center of mass, computing a learned model of the first reference point, determining the center of mass for a new image, and estimating the reference point for the new image in accordance with said model of the reference points.

39. The method of claim 36 wherein the figure is an image of a silhouette, and wherein said first reference point is the center of mass of the silhouette, and said second and third reference points are joints which are respectively located at more remote positions from the center of mass.

40. The method of claim 36 wherein said learned model is an eigen-points model.

* * * * *